May 24, 1960 D. OPPENHEIM 2,937,882
SAFETY BELT FOR VEHICLES
Filed July 21, 1958 2 Sheets-Sheet 1

David Oppenheim
INVENTOR.

May 24, 1960          D. OPPENHEIM          2,937,882
SAFETY BELT FOR VEHICLES
Filed July 21, 1958          2 Sheets-Sheet 2
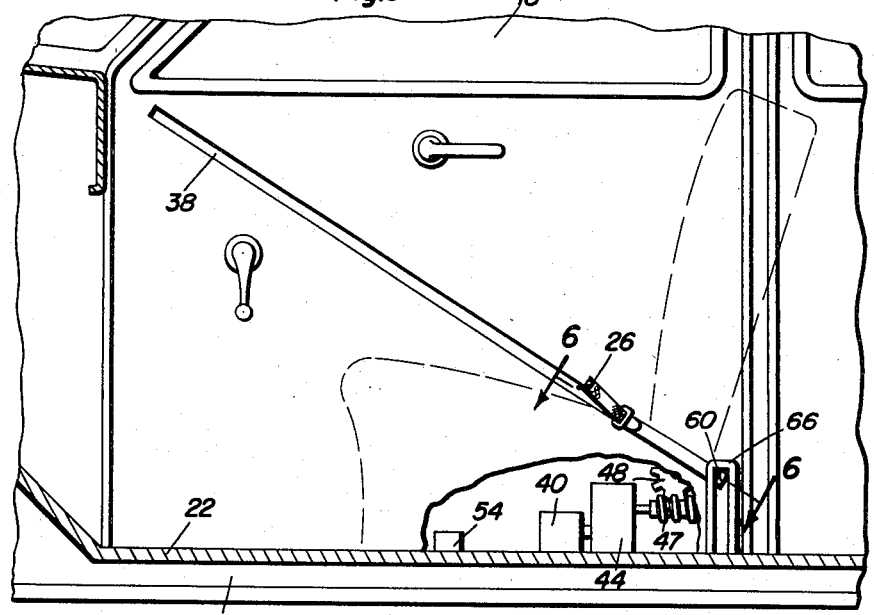
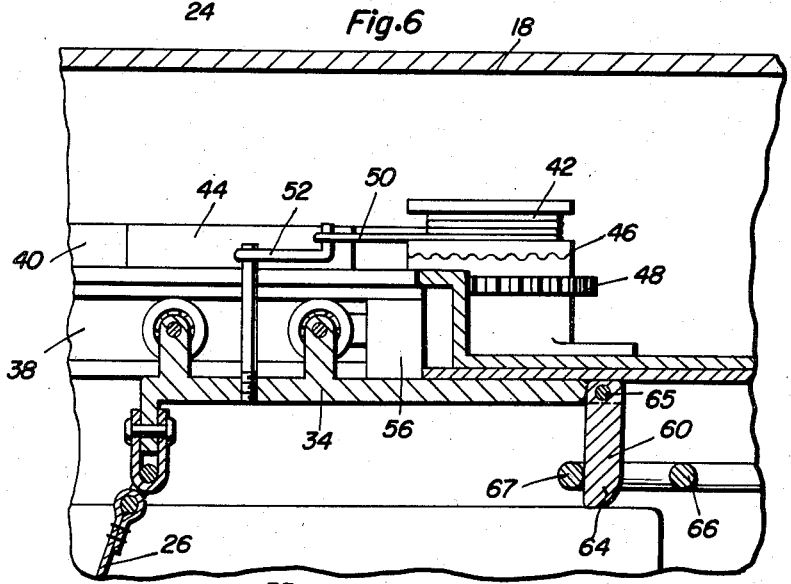
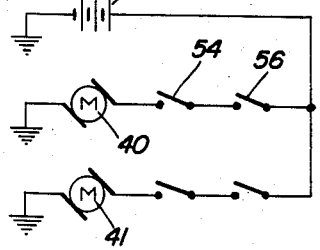
David Oppenheim
INVENTOR.

United States Patent Office 2,937,882
Patented May 24, 1960

2,937,882

SAFETY BELT FOR VEHICLES

David Oppenheim, 475 5th Ave., New York 17, N.Y.

Filed July 21, 1958, Ser. No. 749,753

7 Claims. (Cl. 280—150)

This invention relates to safety devices for motor vehicles and particularly to a safety device which is passed in front of the occupants of the motor vehicle to prevent them from being thrown forwardly out of the seat should the motor vehicle suddenly stop.

This application relates to subject matter similar to that disclosed and claimed in U.S. Ser. No. 523,007, now Patent No. 2,858,144, filed on July 19, 1955, and by the same applicant as in this application for patent. Accordingly, the applicant in this application claims the benefit of the filing date of the earlier application U.S. Serial No. 523,007 for all of the subject matter common to the two applications for patent.

In the previously referred to copending application there is disclosed and claimed a unique safety belt which automatically moves forward in response to opening of one of the doors on the motor vehicle or both of the doors of the motor vehicle, and the safety belt automatically returns to the correct position in front of the passengers or driver of the motor vehicle in response to the closing of the doors.

An object of this invention is to provide means that are especially useful in connection with that safety belt, for separating the space enclosed by the safety belt (and the back rest of the seat) into two or more compartments within which the seat occupants remain during operation of the motor vehicle. Not only is this space separated into compartments, but also the means that achieve this are preferably strap sections that are attached to the belt and that have means for anchoring the inner ends of these sections to a structural support on the motor vehicle. This provides a greater measure of support for the main safety belt and at spaced spaces along the length thereof so that it is not necessary to rely wholly on the end support for the safety belt should there be rapid deceleration for instance as caused by panic stops or impact.

Another and more general object of the invention is to provide means on a safety belt of a motor vehicle, for providing support for that safety belt intermediate the ends of the belt so that the high stresses imposed at the ends of the belt are attenuated by having at least one intermediate strap section attached to the belt and to a structural support in the motor vehicle.

One of the important features of the invention is in the manner of construction of the strap section. One end is separably attached to the belt while the other end is connected with means for retracting the strap section automatically after it is released from the safety belt.

One of the great objections to safety belts in motor vehicle is the bother and nuisance of the belt merely resting on the seat. The strap sections constructed in accordance with this invention are retracted automatically so that they are not a bother and in fact, they are hardly even visible when in the inoperative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a horizontal sectional view of a part of a motor vehicle equipped with a safety belt constructed in accordance with the invention, the safety belt being shown in full lines in the operative position at which passengers and the motor vehicle operator have the belt in the correct position in front of them, and showing the safety belt in the open position in response to opening one of the doors of the motor vehicle.

Figure 5 is a longitudinal fragmentary sectional view with parts broken away to show internal construction, this view showing a part of the mechanism for causing the safety belt to be automatically operative.

Figure 6 is an enlarged sectional view taken on the line 6—6 of Figure 5.

Figure 7 is a schematic wiring diagram.

Figure 1:
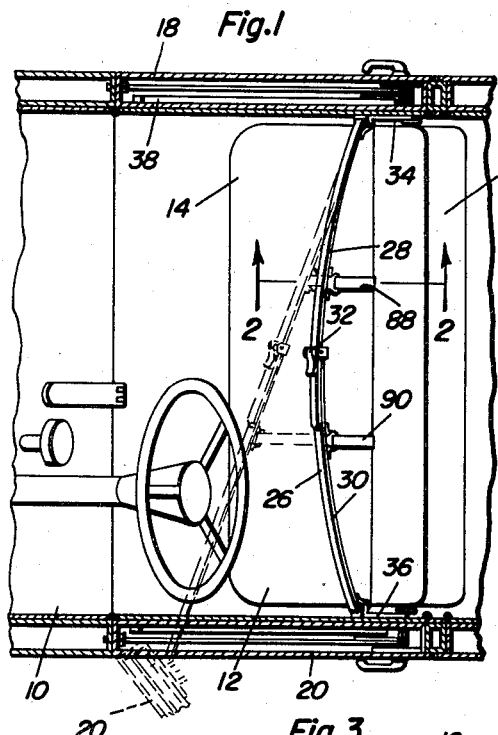
Figure 2:
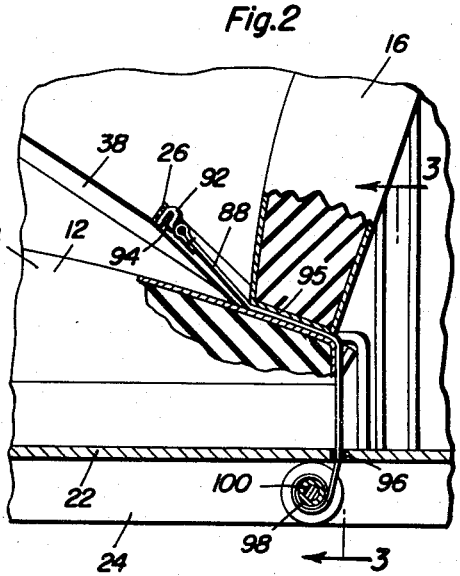
Figure 2 is an enlarged sectional view taken on the line 2—2 of Figure 1.
Figure 3:
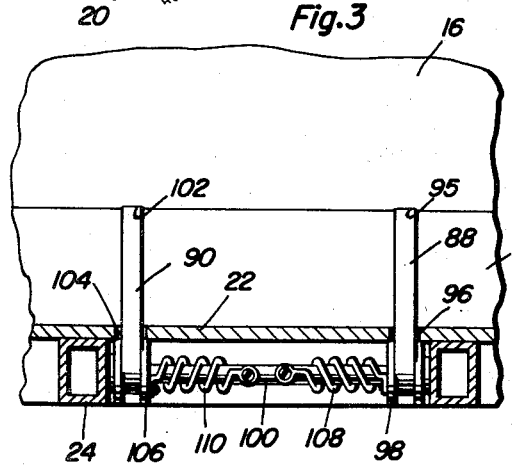
Figure 3 is a sectional view taken on the line 3—3 of Figure 2.
Figure 4:
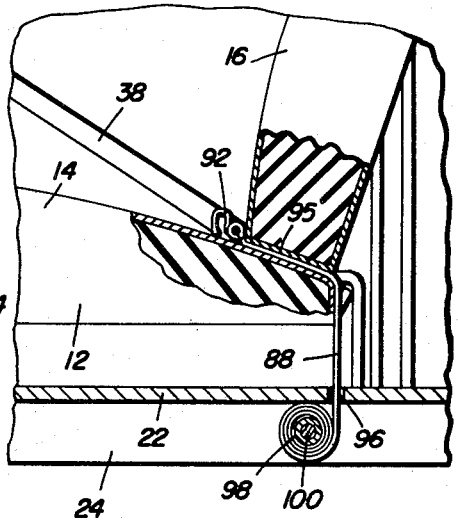
Figure 4 is a sectional view similar to Figure 2 but showing the strap section in the retracted position.

As shown in Figure 1 there is a fragmentary part of a motor vehicle 10 having a front seat 12 with a seat portion 14 and a back rest 16. The vehicle has two doors 18 and 20 connected by conventional hinges to a part of the structure of the motor vehicle. Floor 22 of the vehicle has seat 12 connected to it in the customary way, and the frame 24 of the motor vehicle is shown schematically beneath the floor 22.

As in the referred to copending application safety belt 26 extends across the seat 12 and is preferably made of a strap having parts 28 and 30 connected together by buckle 32 of any suitable type. The ends of the safety belt are secured to a pair of carriages 34 and 36 that operate in tracks 38 and 40 attached to or countersunk in the two doors 18 and 20 of the motor vehicle. The tracks are angled upwardly and forwardly from the lowermost end, Figure 5.

The upper part of each track is adjacent to the hinged edge of the door so that when one of the vehicle doors is open, due to the geometry of the arrangement, the carriage in the track of that door rides up the track and at the same time moves forward with respect to the back rest 16 of the motor vehicle seat enabling the passengers or vehicle operator to alight or enter the motor vehicle without ever touching the safety belt.

When one of the doors is opened and the track supported carriage, for instance carriage 34 moves up the track toward the hinged end of the door; the carriage can return by gravity when the door is closed because the track is in the nature of an inclined plane. In order to assure that the carriage will lock in the closed position and will return all of the way to the bottom of the track, there is a small motor 40 that drives pulley 42 through a gear reducer 44, overriding clutch 46 and a worm and gear 47 and 48 connected respectively with the gear reducer and overriding clutch 46. As shown in Figure 8 the drive line between pulley 42 and the motor 40 has the motor driving gear reducer or an equivalent 44, worm gear 47 and worm wheel 48 enmeshed with the worm gear 47. The worm wheel or gear 48 is drivingly connected with overriding clutch 46, and pulley 42 is attached to one element of the overriding clutch. A cable 50 is attached to the pulley 42 and to an arm 52 that is secured to carriage 34.

The electrical circuit for motor 40 is the same as in the referenced copending application. In addition it is to be noted that the motor 40 and all the structure and wiring connected with it are repeated for door 20 of the motor vehicle. One switch 54 is connected between the source 55 of electrical potential in a motor vehicle and motor 40. The switch 54 is mounted in the path of travel of the door 18, for instance at the door sill. Limit switch 56 is at the lower end of track 38 and is adapted to be operated by a part of the carriage striking the limit switch when the carriage is returned to the lowermost position in its track 38. When door 18 is closed and the carriage 34 is in the latched position, by latch structure 60 (Figure 6) switch 54 is opened. When the door is opened, switch 54 automatically closes but switch 56 is opened. Then, when the door is closed and the carriage 34 moves down the track 38, a part of the carriage will strike the push button of switch 56, closing it and causing the motor to operate. Accordingly, switch 54 is of the type which is opened in response to a first actuation and then closed in response to the second actuation and then again opened in response to the third actuation, etc. Switch 56 is merely an on-off switch that functions as a limit switch.

Latch structure 60 consists of a latch keeper 64 pivoted, for instance by pin 65 to carriage 34 and retained within the confines of the fixed hasp 66 attached to the frame, floor or some other stationary part of the motor vehicle. Latch keeper 60 can move pivotally only a predetermined distance, after which it binds against a part of the carriage (Figure 6). When the door 18 is swung open, the latch keeper separates from the stationary hasp 66 by moving laterally out of one side thereof. When the carriage 34 is returned, the latch keeper 60 is returned to its upright position as shown in Figure 6 by the pull of gravity, aided by the snap-back action resulting from the latch keeper 60 striking the forward leg 67 of stationary hasp 66 when the carriage travels down the track 38.

As previously mentioned and as shown in Figure 7, the described construction in door 18 is duplicated for the door 20, there being motor 41 in door 20 plus a pair of switches wired with source 55, an additional carriage 36 and the remainder of the necessary structure. Although the improvement described in this application subsequently is useful in connection with safety belt 26 and the means for operating that safety belt, it is to be clearly understood that these improvements are applicable to other types of safety belts. Reference is now made principally to Figures 1–4 where there are one or more, preferably two, flexible straps or strap sections 88 and 90 respectively that are separably attached to the safety belt 26. The sections sub-divide the area enclosed by safety belt 26 and back rest 16 of the seat into three compartments for individual passengers and the motor vehicle operator. Strap sections 88 and 90 serve the important function of aiding in the support of safety belt 26 at the instant of impact or during rapid deceleration that is caused otherwise. Typical strap section 88 is made of any suitable flexible material, for instance a woven material and has a hook 92 at one end. The hook is separably engageable within a pocket 94 that is formed on belt 26, for instance, by stitching a small panel on one surface of the belt. Other arrangements for making the connection between the sections 88 and 90 and belt 26 may be resorted to.

Typical section 88 is passed through a small, shallow passageway 95 that is formed in the back rest 16 of the motor vehicle seat at the place where the back rest is in contact with the seat portion 14. Section 88 is passed through an opening 96 in the floor 22 of the motor vehicle and is fixed to a spool 98. The spool is mounted for rotation on a bar 100 located beneath the floor of the motor vehicle and very firmly anchored, for instance by being welded or otherwise fixed to the frame 24 of the vehicle. Section 90 is similarly arranged in the vehicle, passing through a passageway 102 and slot 104 in the seat and floor of the vehicle respectively. Section 90 is secured to spool 106 that is also mounted for rotation on bar 100.

There are means connected with the two spools 98 and 106 for retracting the sections 88 and 90 when they are not being used. These means can be constructed of a number of mechanical arrangements, one of the simplest being a pair of torsion springs 108 and 110 each fixed at one end to the bar 100 and fixed at the outer end to the spools 98 and 106 respectively. The bias of each spring is in a direction tending to rotate the spools for winding the sections 90 and 88 onto the spools. Hooks 92 of each section prevent the straps from passing completely through the passageways 95 and 102, leaving the hooks either partially or completely exposed at the junction of the back rest and the seat portion so that the motorist and/or passengers will have the hooks available for grasping the section or sections 88 and 90 and pulling them toward belt 26 for engagement with the belt. In operation of sections 88 and 90, the sections are merely pulled from their rest position (Figure 4) winding the springs slightly as they are pulled out inasmuch as the springs 108 and 110 yieldingly oppose the pulling out of the sections 88 and 90 and to a small degree. The sections are hooked onto belt 26 and this is all that is necessary to engage the sections with the belt. From Figure 2 it is apparent that should there be rapid deceleration of the motor vehicle and the belt 26 tend to move forward due to this deceleration, sections 88 and 90 will oppose this tendency of belt 26 inasmuch as the retractible means for the strap sections also provide for an anchorage of the inner ends thereof since they are fixed to the spools and the spools are carried by the stationary bar 100. The length of each section 88 and 90 is designed so that when the safety belt 26 is across the passengers in the motor vehicle, the strap sections 88 and 90 are either all the way pulled out their full length or nearly so. The strap sections, then, will permit the safety belt 26 to move forward only a proper distance. Moreover, it is within the contemplation of the invention to have an adjustment in each section 88 and 90 so that the sections can be longer or shorter as necessary or desired. This can be achieved by a buckle arrangement such as buckle 32 in belt 26. Other conventional expedients can be adopted in this regard.

It is understood that various changes may be made in the invention without departing from the scope of the appended claims. Moreover, various additions and alterations coming within the scope of the invention, for instance, additional safety devices for the doors of the motor vehicle may be used, such as those disclosed in the previously referenced copending application.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a safety device for a motor vehicle having doors, a safety belt, means carried by said belt and said doors and responsive to the opening motion of one of said doors to move said belt forward within the vehicle and responsive to closing movement of said one of said doors for moving said belt rearwardly in the vehicle, at least one strap section separably attached to said belt and cooperating with said belt to form a compartment of the area enclosed by said belt, and means for anchoring the opposite end of said strap section in the motor vehicle and also for retracting said strap section in a direction lengthwise of said strap section when said strap section is detached from said belt.

2. In a safety device for a motor vehicle having doors, a safety belt, means carried by said belt and said doors and responsive to the opening motion of one of said doors to move said belt forward within the vehicle and responsive to closing movement of said one of said doors for moving said belt rearwardly in the vehicle, at least one strap section separably attached to said belt and cooperating with said belt to form a compartment of the area enclosed by said belt, means for anchoring the opposite end of said strap section in the motor vehicle, said section anchoring means including a fixed bar, and means connected with said fixed bar and with said strap section to withdraw said strap section from said belt when said strap section is detached from said belt.

3. In a motor vehicle safety device wherein the vehicle has doors, a track on each door inclined downwardly toward the non-hinged edge of the door, a belt adapted to extend across the vehicle to support individuals on the vehicle seat, and means disposed in both of said tracks and secured to said belt for holding said belt in front of the individuals on the seat of the vehicle when the doors are closed and for separating the belt from the individuals in response to opening movement of either door, a pair of strap sections, means securing the outer ends of said sections to said belt, said sections extending approximately at right angles to said belt to thereby separate the area enclosed by said belt and the back rest of the seat into individual compartments, means connected with the inner ends of said strap sections for anchoring said inner ends of said strap sections, and retracting means connected with said anchoring means to withdraw said strap sections inwardly of said seat when said strap sections are separated from said belt.

4. The safety device of claim 3 wherein said retracting means includes a spring retracting on one of said sections to withdraw said section, the seat of the vehicle having a passageway through which said strap section is passed with a portion of said means for attaching said strap section to said belt constituting a stop to prevent complete withdrawal of said section through said passageway.

5. A vehicle safety device in accordance with claim 3 wherein said retracting means includes a spring reacting on one of said sections to withdraw said section, the vehicle having a floor provided with a slot to which said section is adapted to pass, and means attached to the inner end of said section and located beneath said floor to limit the extent of outward movement of said section.

6. In a motor vehicle safety belt and vehicle combination wherein the safety belt is adapted to extend across the front of at least one person in the motor vehicle, means to move said belt in response to opening and closing movements of at least one vehicle door, the improvement comprising a pair of strap sections, means detachably securing the forward ends of said sections to the belt and at spaced places between the ends of the belt, means connected with the rearward portions of the sections for limiting the forward movement of said sections and thereby limiting the forward movement of said belt, and automatically operative means for retracting said sections away from said belt when said forward ends of said sections are detached from said belt.

7. The combination of claim 6 wherein the vehicle seat has a seat portion and a back rest, said sections having their forward portions in front of said back rest and extending between the back rest and seat portion so that when said sections are retracted said seat portion is almost completely free from obstruction caused by the sections.

References Cited in the file of this patent
UNITED STATES PATENTS

| | | |
|---|---|---|
| 2,394,523 | Pancoe | Feb. 5, 1946 |
| 2,403,653 | Geohegan et al. | July 9, 1946 |
| 2,716,561 | Beran | Aug. 30, 1955 |
| 2,830,655 | Lalande | Apr. 15, 1958 |
| 2,850,082 | Day | Sept. 2, 1958 |
| 2,858,144 | Oppenheim | Oct. 28, 1958 |
| 2,861,627 | Smith | Nov. 25, 1958 |

FOREIGN PATENTS

| | | |
|---|---|---|
| 514,945 | Canada | July 26, 1955 |
| 1,125,097 | France | July 9, 1956 |